United States Patent
Matthews et al.

(10) Patent No.: US 8,644,689 B2
(45) Date of Patent: Feb. 4, 2014

(54) CAPTURING VIDEO CONTENT

(75) Inventors: Michael Thano Matthews, Cary, NC (US); Axel Ramirez Flores, Cary, NC (US); Howard Locker, Cary, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 182 days.

(21) Appl. No.: 13/216,839

(22) Filed: Aug. 24, 2011

(65) Prior Publication Data
US 2013/0051765 A1  Feb. 28, 2013

(51) Int. Cl.
*H04N 5/91* (2006.01)
*H04N 5/76* (2006.01)

(52) U.S. Cl.
USPC .......................................... 386/326; 386/286

(58) Field of Classification Search
USPC .......... 386/278, 224, 226, 227, 234, 248, 326
See application file for complete search history.

(56) References Cited

U.S. PATENT DOCUMENTS

2003/0212567 A1* 11/2003 Shintani et al. ............... 705/1
2005/0001908 A1* 1/2005 Lee ........................... 348/231.2

* cited by examiner

*Primary Examiner* — Robert Chevalier
(74) *Attorney, Agent, or Firm* — Kunzler Law Group

(57) ABSTRACT

An apparatus and method are disclosed for capturing video content. A buffer stores a most recent time interval of a video signal. A capture module stops overwrite of a stored video signal in response to a capture command. A copy module retrieves the stored video signal.

20 Claims, 5 Drawing Sheets

CAPTURING VIDEO CONTENT

BACKGROUND

1. Field

The subject matter disclosed herein relates to video content and more particularly relates to capturing video content.

2. Description of the Related Art

Computer users are accustomed to sharing their media related experiences with others. For example, a user may share an image that she has viewed over the Internet through a social media website. Unfortunately, users are unable to easily share television content.

BRIEF SUMMARY

Based on the foregoing discussion, the inventors have recognized a need for an apparatus and method that captures video content. Beneficially, such an apparatus and method would support the capture and retrieval of a video signal.

The embodiments of the present invention have been developed in response to the present state of the art, and in particular, in response to the problems and needs in the art that have not yet been fully solved by currently available video capture methods. Accordingly, the embodiments have been developed to provide an apparatus and method for capturing video content that overcome many or all of the above-discussed shortcomings in the art.

The apparatus to capture is provided with a plurality of modules. These modules in the described embodiments include a buffer, a storage device, a processor, a capture module, and a copy module.

The buffer stores a most recent time interval of a video signal. The storage device stores machine-readable code. The processor executes the machine-readable code. The capture module stops overwrite of a stored video signal in response to a capture command. The copy module retrieves the stored video signal. A method and program product perform the functions of the apparatus.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
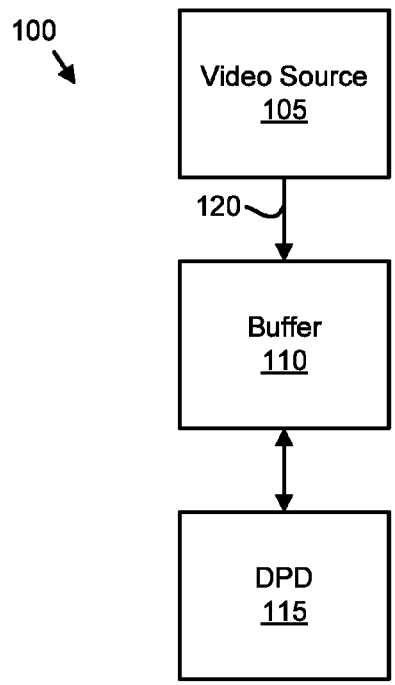
FIG. 1 is a schematic block diagram illustrating one embodiment of a video capture system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine-readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable code and/or software for execution by various types of processors. An identified module of machine-readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine-readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine-readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine-readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine-readable code embodied on a storage device may be transmitted using any appropriate medium, including but not limited to wireless, wireline, optical fiber cable, Radio Frequency (RF), etc., or any suitable combination of the foregoing.

Machine-readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine-readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine-readable code. These machine-readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine-readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine-readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine-readable code.

FIG. 1 is a schematic block diagram illustrating one embodiment of a video capture system 100. The system 100 may capture video from a video source 105 for a Data Processing Device (DPD) 115. The system 100 includes the video source 105, a buffer 110, and the DPD 115. In one embodiment, the DPD 115 is a computer workstation. Alternatively, the DPD 115 may be a notebook computer, a tablet computer, a cellular telephone, a video game console, an entertainment appliance, or the like.

The video source 105 may transmit a video signal 120 to the buffer 110. The video signal 120 may be a television signal. In one embodiment, the video signal 120 is a digital television signal. The video source 105 may be a television, a portable entertainment device, a cable modem, a satellite modem, or the like. In one embodiment, the video source 105 transmits the video signal 120 through an output port.

In one embodiment, the video signal 120 is transmitted over High-Definition Multimedia Interface (HDMI). The HDMI interface may be compatible with EIA/CEA-861 standards as defined on the filing date of the present application. Alternatively, the video signal 120 may be transmitted over a radio frequency coaxial cable, a composite video interface, a S-video interface, a Syndicat des Constructeurs d'Appareils Radiorécepteurs et Téléviseurs (SCART) interface, a component video interface, a D-terminal interface, or the like, wherein each interface is compatible with a corresponding standard as defined on the filing date of the present application.

The buffer 110 may store a most recent time interval of the video signal 120. In one embodiment, the most recent time interval is in the range of one to five minutes in length beginning at a most recently received portion of the video signal 120. The buffer 110 may further allow the stored video signal to be overwritten after the most recent time interval is expired. For example, if the most recent time interval is one minute, the buffer 110 may store a data block comprising one minute of the video signal 110. The buffer 110 may allow the overwrite of each portion of the data block one minute after that portion is stored to the buffer 110. Alternatively, the buffer 110 may allow the overwrite of the data block one minute after last portion of the video signal 120 is stored to data block.

The DPD 115 may receive a capture command. In one embodiment, the user communicates the capture command to the DPD 115 through a user interface. The user interface may comprise a graphical user interface (GUI) and a pointing device such as a mouse, a trackball, a touch screen, an eye tracking device, or the like. Alternatively, the user interface may comprise the GUI and a keyboard. The DPD 115 may further stop overwrite of the stored video signal in response to the capture command. In one embodiment, the DPD 115 retrieves the stored data signal from the buffer 110.

In one embodiment, the buffer 110 continues to store the video signal 120 without overwriting the stored video signal subsequent to stopping overwrite of the stored video signal. The buffer 110 may communicate the stored video signal to the DPD 115. In a certain embodiment, the DPD 115 displays the stored video signal.

In one embodiment, the video source 105, the buffer 110, and the DPD 115 are embodied within a single device. For example, the DPD 115 may include a display. The video source 105 may be a television tuner embodied within the device and provide the video signal 120 to the DPD 115 for display.

Figure 2:
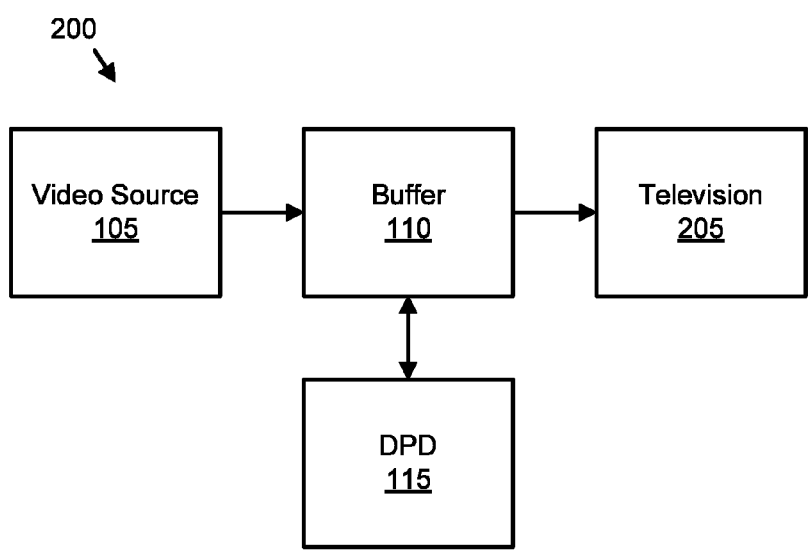
FIG. 2 is a schematic block diagram illustrating one alternate embodiment of a video capture system.

FIG. 2 is a schematic block diagram illustrating one alternate embodiment of a video capture system 200. The video source 105, buffer 110, and DPD 115 of FIG. 1 are shown with a television 205. The system 200 may capture video for the DPD 115. The description of the system 200 refers to elements of FIG. 1, like numbers referring to like elements.

The video source 105 may transmit a video signal 120 to the buffer 110. The buffer 110 may transmit the video signal 120 to the television 205. The buffer 210 may further transmit the video signal 120 to the television 205. The DPD 115 may stop the overwriting of the stored video signal in the buffer 110 in response to the capture command.

Figure 3:
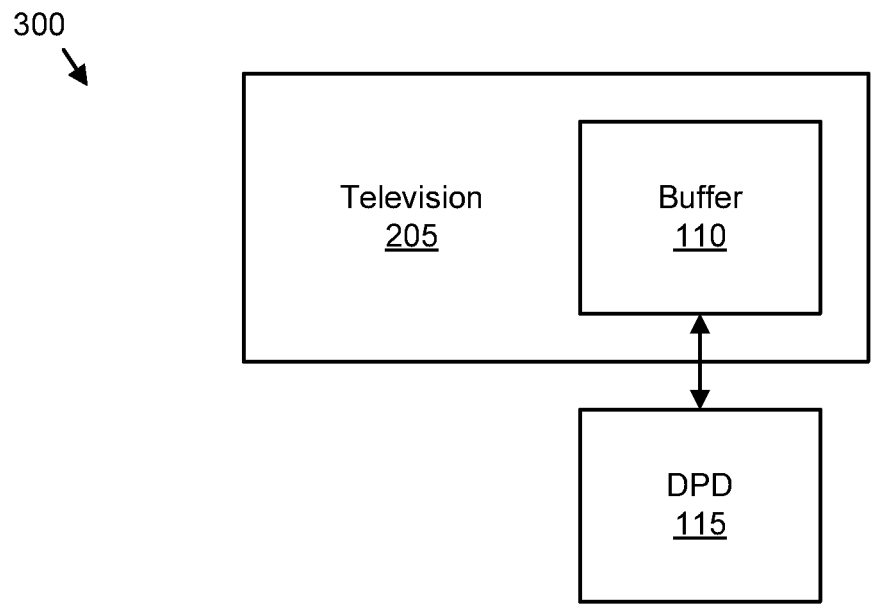
FIG. 3 is a schematic block diagram illustrating one alternate embodiment of a video capture system.

FIG. 3 is a schematic block diagram illustrating one embodiment of a video capture system 300. The system 300 includes the television 205 of FIG. 2 with the buffer 110 embedded within the television 205. The description of the system 300 refers to elements of FIGS. 1-2, like numbers referring to like elements.

In one embodiment, the DPD 115 communicates with the television 205. In a certain embodiment, the DPD 115 only communicates with the buffer 110, but does not communicate with the television 205. For example, the storing of the video signal 120 by the buffer 110 may be transparent to the television 205. In an alternate embodiment, the television 205 manages the buffer 110 as directed by the DPD 115.

Figure 4:
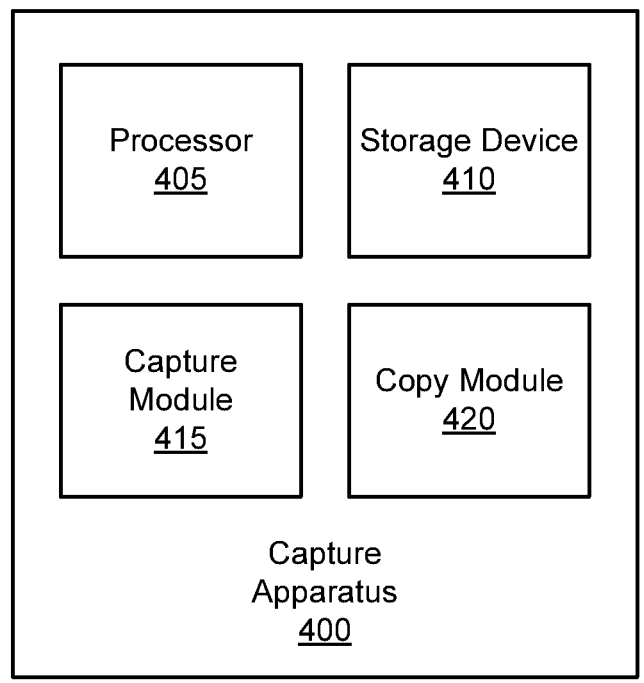
FIG. 4 is a schematic block diagram illustrating one embodiment of a capture apparatus.

FIG. 4 is a schematic block diagram illustrating one embodiment of a capture apparatus 400. The apparatus 400 may capture and retrieve the video signal 120 of FIGS. 1-3. The description of the apparatus 400 refers to elements of FIGS. 1-3, like numbers referring to like elements.

The buffer 110 may store electronic data such as a digital representation of the digital signal 120. In one embodiment, the buffer 110 is a semiconductor memory. The buffer 110 may include logic that manages the storage and retrieval of the data.

The storage device 410 stores machine-readable code. The processor 405 executes the machine-readable code. In one embodiment, the storage device 410 and the processor 405 are embodied in the DPD 115.

The buffer 110 stores a most recent time interval of the video signal 120. The capture module 415 stops overwrite of a stored video signal in response to a capture command. The copy module 420 retrieves the stored video signal. The function of the buffer 110, capture module 415, and copy module 420 will be described in more detail in relation to FIG. 5.

Figure 5:
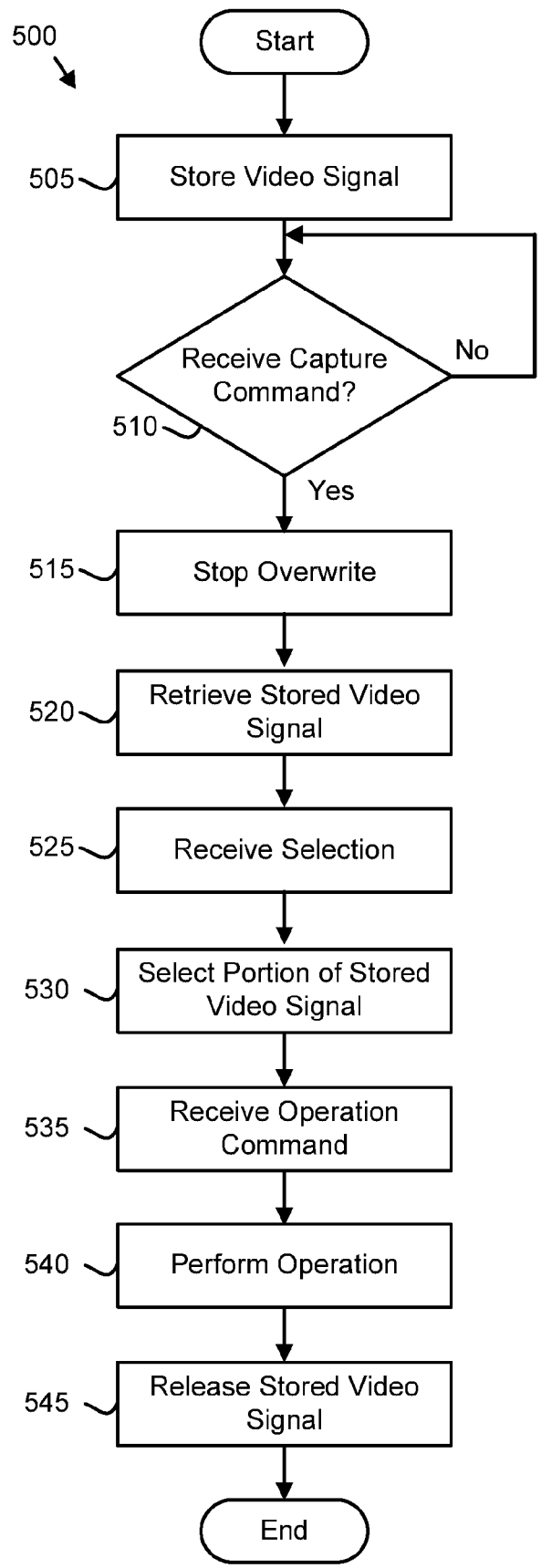
FIG. 5 is a schematic flow chart diagram illustrating one embodiment of a video capture method.

FIG. 5 is a schematic flow chart diagram illustrating one embodiment of a video capture method 500. The method 500 may perform the functions of the apparatus 400 of FIG. 4. The description of the method 500 refers to elements of FIGS. 1-4, like numbers referring to like elements.

In one embodiment, the method 500 is performed by the processor 405. Alternatively, the method 500 may be performed by a program product. The program product may comprise the storage device 410 storing machine-readable code that is executed by the processor 405 to perform the method 500.

The method 500 starts, and in one embodiment, the buffer 410 stores 505 the most recent time interval of the video signal 120. The buffer 410 may receive the video signal 120 from an output signal of the television 205. Alternatively, the buffer 410 may intercept the video signal 120 as the video signal 120 is communicated to the television 205. In addition, the buffer 110 may overwrite each portion of the stored video signal that is not included within the most recent time interval of the video signal 120.

In one embodiment, the capture module 415 determines 510 if the capture module 415 receives a capture command. The capture module 415 may receive the capture command through the user interface. The capture command may be initiated in response to a user activating a control. In one embodiment, the control for the capture command is linked to a social media website.

In an alternate embodiment, the control for the capture command may be embodied in a social media website. As used herein, a social media website refers to an Internet-based website, communications channel, and the like that facilitates communications and media sharing between users. The control may support the sharing, uploading, posting, and/or sending of a portion of the stored video signal.

The control may also be embodied in a television remote. For example, the user may press a button on the television remote to initiate the capture command. Alternatively, the control may be displayed as part of a touch screen display that displays the video signal 120.

If the capture module 415 has not received a capture command, the capture module 415 may continue to monitor for a capture command. If the capture module 415 receives the capture command, the capture module 415 may stop 515 overwrite of the stored video signal in the buffer 110 in response to the capture command.

In one embodiment, the buffer 110 manages the stored video signal in response to commands from the capture module 415. The buffer 110 may identify intervals of the stored video signal and retain and/or delete the intervals according to a policy.

In one embodiment, the capture module 415 stops 515 overwrite of the stored video signal in the buffer 110 by communicating a stop time to the buffer 110. The buffer 110 may store the stop time in a register and refrain from overwriting the stored video signal for a specified time interval backward in time from the stop time. For example, the capture module for 15 may communicate the stop time of 16:42:37 to the buffer 110. If the specified time interval is one minute, the buffer 110 may refrain from overwriting the stored video signal captured between 16:41:37 and 16:42:37.

In an alternate embodiment, the buffer 110 may refrain from overwriting a portion of the stored video signal a specified proceeding interval before the stop time and a specified subsequent interval after the stop time. For example, if the stop time is 16:42:37, the buffer 110 may refrain from overwriting the stored video signal captures between 16:41:07 and 16:42:07.

In an alternate embodiment, the buffer 110 is configured as a memory space. The capture module 415 may write data to and read data from the buffer 110. In one embodiment, the capture module 415 stops 515 the overwrite of the stored video signal in the buffer 110 by not writing data to a specified memory space of the stored video signal.

The copy module 420 may retrieve 520 the stored video signal from the buffer 110. In one embodiment, the copy module 420 retrieves 520 a specified interval of the stored video signal from the buffer 110.

Alternatively, the copy module 420 may retrieve 520 still images from the stored video signal. In one embodiment, the copy module 420 detects one or more changes of scene in the stored video signal and retrieves 520 the first image from each change of scene. In an alternate embodiment, the copy module retrieves 520 images that are spaced by a sample interval. The sample interval may be in the range of two to 10 seconds.

In one embodiment, the copy module 420 receives 525 a selection of a portion of the stored video signal. In one embodiment, the copy module 420 displays one or more images from the stored video signal. The displayed images may be the images retrieved 520 from the buffer 110. Alternatively, the copy module 420 may parse the images from the stored video signal after the stored video signal is retrieved from the buffer 110. The copy module 420 may receive a selection of one or more images. For example, each image clicked on by pointing device may be selected.

In one embodiment, the copy module 420 displays a point in time from the stored video signal in a selection GUI. The copy module 420 may further display a timeline for the stored video signal in the selection GUI. The selection GUI may include a mark in slider and a mark out slider. The copy module 420 may receive 525 the selection of the portion of the stored video signal between the mark in slider and the mark out slider.

The copy module 420 may select 530 the indicated portion of the stored video signal. In one embodiment, the coffee module 420 writes a mark in time and a marked out time to registers to select 530 the indicated portion of the stored video signal. In an alternate embodiment, the copy module 420 selects 530 portions of the stored video signal that follow each selected image.

In one embodiment, the copy module 420 receives 535 an operation command. The copy module 420 may display a menu of operation commands through a GUI. The copy module 420 may receive 535 an operation command selected from the menu. The operation command may include a command for appending a comment, a command for appending a tag, and a command for editing the selected portion of the stored video signal. In one embodiment, the menu includes a send option, a save option, and a share option.

In one embodiment, the copy module 420 displays a list of send options in response to receiving the send option operation command. The list of send options may include options to send the portion of stored video signal via e-mail, via a cellular telephone number, or the like.

The copy module 420 may further display a list of save options in response to receiving the save option operation command. The list of save options may include options to save the portion of the stored video signal to a non-volatile storage device such as a hard disk drive, options to save the portion of the stored video signal to a cloud storage device, or the like.

The copy module 420 may also display a list of share options in response to receiving a share option operation command. The list of share options may include options to post the portion of the stored video signal to one or more social media websites.

In one embodiment, the copy module 420 performs 540 the operation specified by the operation command. The copy module 428 perform 540 the operation by communicating the selected portion of the stored video signal to a target. The target may be an e-mail address, a cellular telephone, a storage device, and/or a website such as a social media website.

For example, the copy module 420 may communicate the portion of the stored video signal to a social media web site.

Alternatively, the operation may be selected from the group of operations consisting of appending a comment, appending a tag to the selected stored video signal, and editing the selected portion of the stored video signal. In one embodiment, the copy module 420 receives 535 multiple operation commands and performs 540 multiple operations.

The capture module 415 may release the stored video signal for overwrite by the buffer 110 and the method 500 ends. In one embodiment, the capture module 415 clears the stop command at the buffer 110. Alternatively, the capture module 415 may resume writing the video signal 122 to the memory space of the stored video signal.

FIGS. 6A-D are schematic block diagrams illustrating one embodiment of a buffer 110. The buffer 110 may be the buffer 110 FIGS. 1-3. The description of the buffer 110 refers to elements of FIGS. 1-5, like numbers referring to like elements.

Figure 6A:
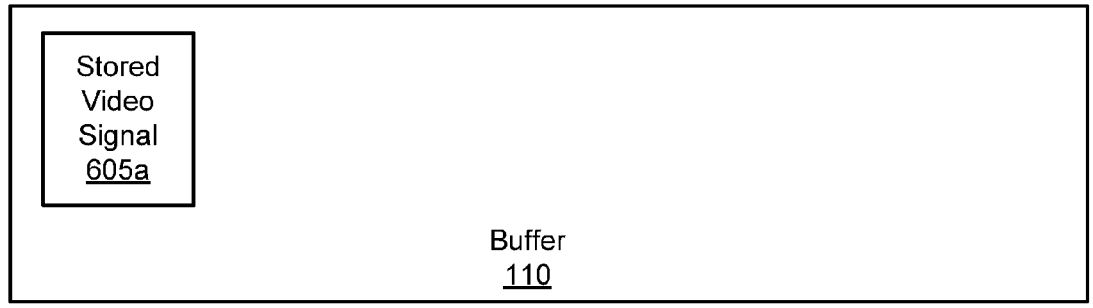
FIGS. 6A-D are schematic block diagrams illustrating one embodiment of a buffer.
Figure 6B:
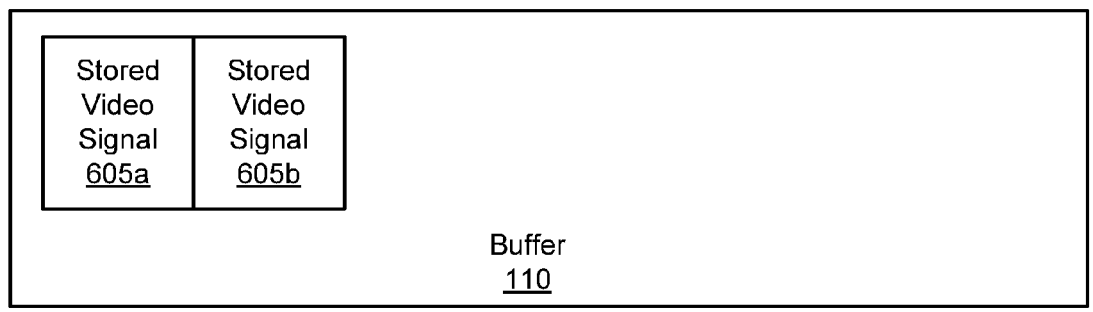
Figure 6C:
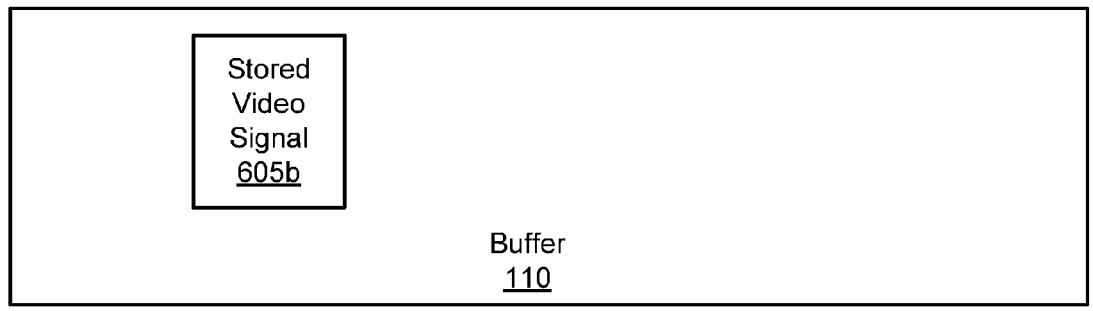

The buffer 110 may store a most recent time interval of the video signal 120 as a first stored video signal 605a. The capture module 415 may stop overwrite of the first stored video signal 605a in response to the capture command. However, the buffer 110 may continue to store the video signal 120 as a second stored video signal 605b without overwriting the first stored video signal 605a as shown in FIG. 6B. After the copy module 420 retrieves the first stored video signal 605a from the buffer 110, the buffer 110 may overwrite the first stored video signal 605a as shown in FIG. 6C.

Figure 6D:
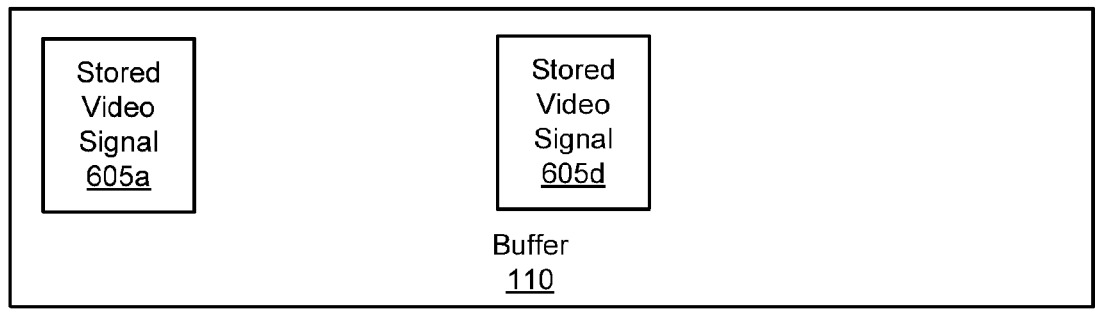

In one embodiment, the buffer 110 may store the first stored video signal 605a for an extended period after the copy module 420 retrieves the first stored video signal 605a from the buffer 610 as illustrated in FIG. 6D where the second stored video signal 605b and a third stored video signal 605c have been overwritten or are otherwise no longer stored in the buffer 110, while a new fourth stored video signal 605d is retained.

Figure 7:
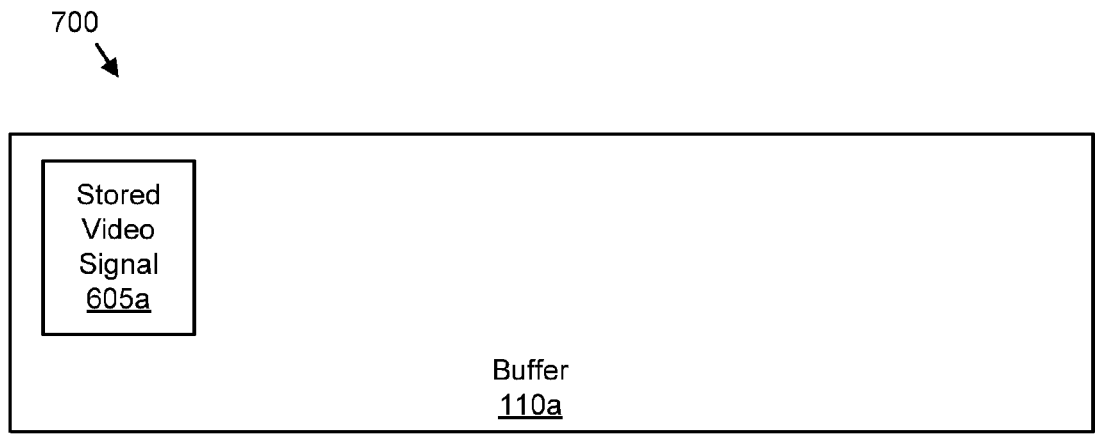
FIG. 7 is a schematic block diagram illustrating one embodiment of a double buffer.
Figure 7:
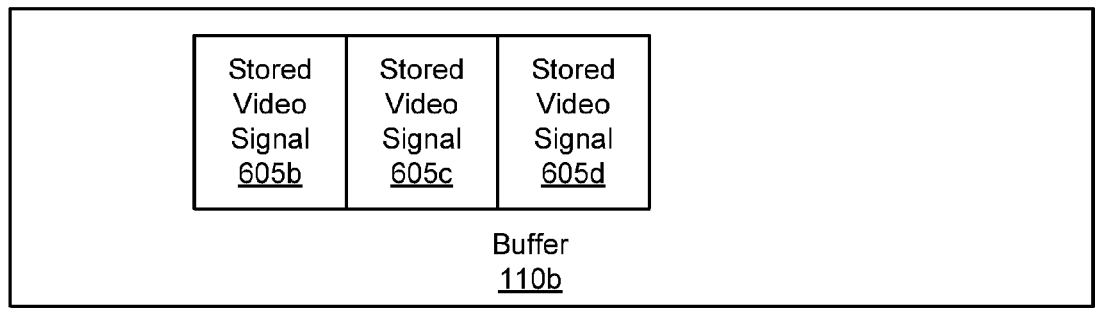

FIG. 7 is a schematic block diagram illustrating one embodiment of a double buffer 700. The double buffer 700 may be the buffer 110 of FIGS. 1-3. The double buffer 700 includes a first buffer 110a and a second buffer 110b. The description of the double buffer 700 refers to elements of FIGS. 1-6, like numbers referring to like elements.

The first buffer 110a may store a most recent time interval of the video signal 120 as a first stored video signal 605a. The capture module 415 may stop overwrite of the stored video signal 605a in response to the capture command. However, the second buffer 110b may continue to store the video signal 120 as the second, third, and fourth stored video signal 605b-d.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a buffer storing a most recent time interval of a video signal as the video signal is transmitted from a video source to a television, wherein the stored video signal is overwritten after the most recent time interval is expired;
a storage device storing machine-readable code;
a processor executing the machine-readable code, the machine-readable code comprising:
a capture module stopping overwrite of a stored video signal in response to a capture command; and
a copy module retrieving the stored video signal.

2. The apparatus of claim 1, the copy module further receiving a selection of a portion of the stored video signal and communicating the selected portion of the stored video signal to a target.

3. The apparatus of claim 2, the copy module further performing an operation on the selected portion of the stored video signal in response to an operation command, the operation selected from appending a comment, appending a tag, and editing the selected portion of the stored video signal.

4. The apparatus of claim 2, wherein the target is a storage device.

5. The apparatus of claim 2, wherein the target is a website.

6. The apparatus of claim 2, wherein the target is an email address.

7. The apparatus of claim 1, wherein the most recent time interval is in the range of one to five minutes.

8. The apparatus of claim 1, wherein the buffer continues to store the video signal without overwriting the stored video signal subsequent to the capture module stopping overwrite of the stored video signal.

9. The apparatus of claim 1, wherein the buffer is organized as a double buffer with a second buffer continuing to store the video signal subsequent to the capture module stopping overwrite of the stored video signal in a first buffer.

10. The apparatus of claim 1, wherein the video signal is a television video signal.

11. A method of video capture comprising:
storing, by use of a processor, a most recent time interval of a video signal in a buffer as the video signal is transmitted from a video source to a television, wherein the stored video signal is overwritten after the most recent time interval is expired;
stopping overwrite of a stored video signal in response to a capture command; and
retrieving the stored video signal.

12. The method of claim 11, the method further comprising receiving a selection of a portion of the stored video signal and communicating the selected portion of the stored video signal to a target, wherein the target is selected from the group consisting of a storage device, a web site, and an email.

13. The method of claim 11, wherein the most recent time interval is in the range of one to five minutes.

14. The method of claim 11, wherein the buffer continues to store the video signal without overwriting the stored video signal subsequent to stopping overwrite of the stored video signal.

15. The method of claim 11, wherein the buffer is organized as a double buffer with a second buffer continuing to store the video signal subsequent to stopping overwrite of the stored video signal in a first buffer.

16. A program product comprising a storage device storing machine-readable code executed by a processor to perform the operations of:
storing, by use of a processor, a most recent time interval of a video signal in a buffer as the video signal is transmitted from a video source to a television, wherein the stored video signal is overwritten after the most recent time interval is expired;
stopping overwrite of a stored video signal in response to a capture command; and
retrieving the stored video signal.

17. The program product of claim 16, the operations further comprising receiving a selection of a portion of the stored video signal and communicating the selected portion of the stored video signal to a target, wherein the target is selected from the group consisting of a storage device, a web site, and an email.

18. The program product of claim 16, wherein the most recent time interval is in the range of one to five minutes.

19. The program product of claim 16, wherein the buffer continues to store the video signal without overwriting the stored video signal subsequent to stopping overwrite of the stored video signal.

20. The program product of claim 16, wherein the buffer is organized as a double buffer with a second buffer continuing to store the video signal subsequent to stopping overwrite of the stored video signal in a first buffer.

\* \* \* \* \*